(12) United States Patent
Ellis et al.

(10) Patent No.: US 11,381,583 B1
(45) Date of Patent: Jul. 5, 2022

(54) SYSTEMS AND METHODS FOR DETECTING ANOMALOUS SYSTEM OR NETWORK BEHAVIOR

(71) Applicant: DIMENSIONALMECHANICS, INC., Bellevue, WA (US)

(72) Inventors: Jason K. Ellis, Bellevue, WA (US); Rajeev Dutt, Redmond, WA (US)

(73) Assignee: DimensionalMechanics, Inc., Bellevue, WA (US)

( * ) Notice: Subject to any disclaimer, the term of this patent is extended or adjusted under 35 U.S.C. 154(b) by 729 days.

(21) Appl. No.: 16/178,284

(22) Filed: Nov. 1, 2018

Related U.S. Application Data

(60) Provisional application No. 62/581,409, filed on Nov. 3, 2017.

(51) Int. Cl.
| | |
|---|---|
| H04L 9/40 | (2022.01) |
| G06F 11/00 | (2006.01) |
| G06F 17/16 | (2006.01) |
| G06F 11/34 | (2006.01) |
| G06N 3/08 | (2006.01) |
| G06K 9/62 | (2022.01) |

(52) U.S. Cl.
CPC ........ *H04L 63/1425* (2013.01); *G06F 11/008* (2013.01); *G06F 11/3419* (2013.01); *G06F 17/16* (2013.01); *G06K 9/6256* (2013.01); *G06N 3/08* (2013.01); *G06F 2201/81* (2013.01)

(58) Field of Classification Search
CPC .... H04L 63/1425; G06F 11/008; G06F 17/16; G06F 11/3419; G06F 2201/81; G06N 3/08; G06K 9/6256
See application file for complete search history.

(56) References Cited

U.S. PATENT DOCUMENTS

| | | | |
|---|---|---|---|
| 7,181,768 B1 * | 2/2007 | Ghosh | H04L 63/1408 726/23 |
| 2017/0364792 A1 * | 12/2017 | Chai | G06N 3/0445 |
| 2018/0115567 A1 * | 4/2018 | El-Moussa | G06F 17/141 |
| 2018/0260697 A1 * | 9/2018 | Sun | G06N 3/08 |

\* cited by examiner

*Primary Examiner* — Farid Homayounmehr
*Assistant Examiner* — Suman Debnath
(74) *Attorney, Agent, or Firm* — Fortem IP LLP; Matt Lincicum

(57) ABSTRACT

A system and associated methods for the detection of anomalous behavior in a system. In some embodiments, time-series data that is obtained from the system (such as log data) may be used as an input to a process that converts the data into greyscale values. The greyscale values are used to construct an "image" of the system operation that is used as an input to a convolutional neural network (CNN). The image is used to train the neural network so that the neural network is able to recognize when other input "images" constructed from time-series data are anomalous or otherwise indicative of a difference between the prior (and presumed normal or acceptable) and the current operation of the system.

14 Claims, 3 Drawing Sheets

SYSTEMS AND METHODS FOR DETECTING ANOMALOUS SYSTEM OR NETWORK BEHAVIOR

CROSS REFERENCE TO RELATED APPLICATION

This application claims the benefit of U.S. Provisional Application No. 62/581,409, entitled "Systems and Methods for Detecting Anomalous System or Network Behavior," filed Nov. 3, 2017, which is incorporated herein by reference in its entirety (including the Appendix) for all purposes.

BACKGROUND

Computer and data transmission networks are important parts of the infrastructure used by companies, the Government, and the public to exchange messages, transfer information, access services, and perform important tasks. As a result, the systems, devices, and networks involved in performing such tasks are relied upon to be secure and to be operating properly. The need to ensure this type of secure and reliable behavior has led to the development of methods for managing networks and detecting anomalous behaviors, with the expectation that by detecting such anomalous behaviors, security breaches and other harmful actions (or attempts at such actions) can be identified and prevented (or in some cases, remedied) more efficiently.

Conventionally, network behavior anomaly detection (NBAD) is the term used to describe continuous monitoring of a proprietary network for an unusual event, for an event or set of events suggesting an anomaly, or for detecting suggestive trends in network behavior or operations. NBAD is an integral part of network behavior analysis (NBA), which offers an additional layer of security to that provided by traditional anti-threat applications such as firewalls, anti-virus software and spyware-detection software. An NBAD program typically tracks critical network characteristics in real-time and generates an alarm or warning, or takes a specified corrective action if an anomaly or suggestive trend in network characteristics is detected. This is important, as such an anomaly or trend might indicate the presence of a threat or an attempt to cause harm to the network or its users. Large-scale illustrative examples of such network characteristics include increased traffic volume, bandwidth use, or protocol use. An NBAD program can also monitor the behavior of an individual network subscriber (or set of subscribers) to determine if they are engaging in (or attempting to engage in) malicious activity. In order for NBAD to be optimally effective, a baseline of "normal" or expected network or user behavior is typically established over a period of time. In this way, once certain parameters have been defined as indicative of "normal" operation, any departure from one or more of them can be flagged as a potential anomaly that is a candidate for further investigation.

Conventional approaches to monitoring a network and using network related data to detect anomalies (such as malicious activity or an attempt at such) typically suffer from one or more limitations that make them less desirable for use. These include an inability to efficiently detect certain types of anomalous behavior, and a reliance on a set of "signatures" that can be searched for in order to indicate a potential problem. Such conventional methods may also need to rely on a relatively large amount of example data in order to be effective. In contrast, embodiments of the system and methods described herein are able to capture information regarding typical and atypical system behavior from less time-series data and process that data using a convolutional neural network (CNN) to identify potentially malicious behaviors that might be undetectable using conventional approaches.

Embodiments of the inventive system, apparatus, and methods are intended to address and solve these and other problems or disadvantages, both individually and collectively.

SUMMARY

The terms "embodiments of the invention", "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. The embodiments of the invention described herein are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Described herein are embodiments of a system and associated methods for the detection of anomalous behavior in a network or system. In some embodiments, time-series data that is obtained from the network or system (such as log data) may be used as an input to a process that converts the data into greyscale values. The greyscale values are used to construct an "image" of the network/system operation that is used as an input to a convolutional neural network (CNN). The images are used to train the neural network so that the neural network is able to recognize when other input "images" constructed from time-series data are anomalous or otherwise indicative of a difference between the prior (and presumed normal or acceptable) and the current operation of the network or system.

In one embodiment, the invention is directed to a method for detecting anomalous behavior in a system, where the method includes:

acquiring a set of time-series data generated by or characterizing the system;

converting the set of time-series data into a set of grey-scale values;

forming a plurality of matrices from the set of grey-scale values, wherein each matrix represents the grey-scale values at a specific time or during a specific time interval as an image;

training a neural network using the plurality of matrices;

acquiring time-series data representing a current operational state of the system;

converting the set of time-series data representing the current operational state into grey-scale values;

forming a matrix from the grey-scale values;

inputting the formed matrix to the trained neural network;

generating an output from the trained neural network determining if the output indicates the presence of an anomaly; and generating an alert in response to the indication of an anomaly.

In another embodiment, the invention is directed to an apparatus for detecting anomalous behavior in a system, where the apparatus includes:

an electronic processor programmed with a set of executable instructions;

an electronic data storage in which are stored the set of executable instructions, wherein the set of instructions includes instructions, which when executed, cause the apparatus to implement one or more processes to acquire a set of time-series data generated by or characterizing the system;

convert the set of time-series data into a set of grey-scale values;

form a plurality of matrices from the set of grey-scale values, wherein each matrix represents the grey-scale values at a specific time or during a specific time interval as an image;

train a neural network using the plurality of matrices;

acquire time-series data representing a current operational state of the system;

convert the set of time-series data representing the current operational state into grey-scale values;

form a matrix from the grey-scale values;

input the formed matrix to the trained neural network;

generate an output from the trained neural network determine if the output indicates the presence of an anomaly; and generate an alert in response to the indication of an anomaly.

In yet another embodiment, the invention is directed to a method for detecting anomalous behavior in a system, where the method includes:

acquiring time-series data representing a current operational state of the system;

converting the set of time-series data representing the current operational state into grey-scale values;

forming a matrix from the grey-scale values;

inputting the formed matrix to a neural network trained to determine one or more of a predicted state vector of the system at a future time, a probability that the system is operating in a normal state, a probability that a system anomaly has occurred, or an image describing a future state of the system;

generating an output from the trained neural network;

determining if the output indicates the presence of an anomaly; and generating an alert in response to the indication of an anomaly.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
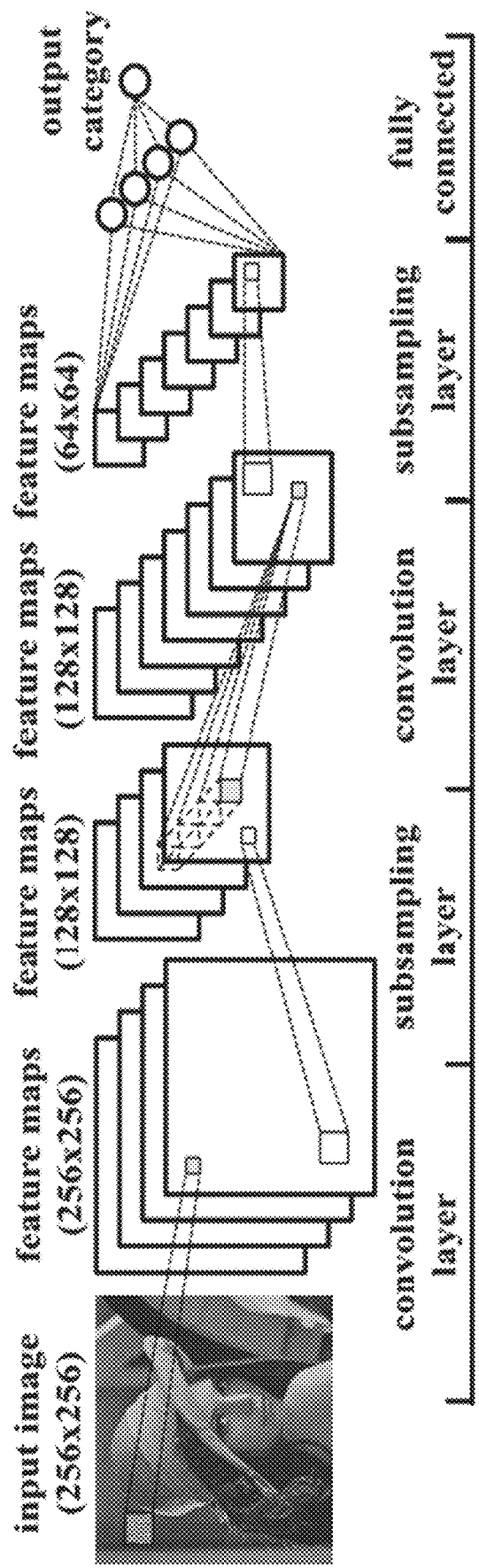
FIG. 1 is a diagram illustrating a neural network comprised of a set of "neuron" layers that are used to implement an image processing function.

The subject matter of embodiments of the invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Accordingly, embodiments are not limited to the embodiments described herein or depicted in the drawings, and various embodiments and modifications can be made without departing from the scope of the claims presented.

Embodiments of the invention will be described more fully hereinafter with reference to the accompanying drawings, which form a part hereof, and which show, by way of illustration, exemplary embodiments by which the invention may be practiced. The invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware-implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, controller, etc.) that is part of a client device, server, network element, or other form of computing or data processing device/platform. The processing element or elements are programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array (PGA or FPGA), application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

In some embodiments, one or more of the operations, functions, processes, or methods described herein may be implemented in whole or in part by the development or training of a neural network, the application of a machine learning technique or techniques, or the development or implementation of an appropriate decision process. In some embodiments, the inventive system and methods may utilize or access a data processing platform that assists in the construction of a deep learning model by analyzing and evaluating the structure and performance of multiple AI or learning/decision process models.

Before describing one or more embodiments of the inventive system and methods for detecting network or system anomalies (among other uses), further details regarding one of the components of the system and methods will be provided. This component is a (convolutional) neural network, which is used as a form of image processor or classifier in certain embodiments.

Note that a neural network or deep learning model may be represented as a set of layers, with each layer composed of nodes of "neurons" and with connections between nodes in the same or different layers. The set of layers operate on an input to provide a decision (such as a classification) as an output. It is noted that there are other types of deep learning networks that can perform tasks such as unsupervised learning or reinforcement learning. Typically, these networks have to be trained using some amount of data that varies in quantity depending upon the type of problem being solved. In general, training a neural network is computationally more intensive than querying a neural network.

From one perspective, a neural network is a system of interconnected artificial "neurons" that exchange messages between each other. The connections between neurons (which form the nodes in a network) have numeric weights that are tuned during a training process, so that a properly trained network will respond correctly when presented with an image or pattern to recognize (for example). The network consists of multiple layers of feature-detecting "neurons", including an input later, an output layer, and typically one or more hidden layers. Each neuron may perform a specific set of operations on its inputs, such as forming a linear or non-linear combination of inputs and weights, and then subjecting the result to a non-linear activation function to produce an output.

Each layer has many neurons that respond to different combinations of inputs from the previous layers. Training of a network is performed using a "labeled" or annotated dataset of inputs in an assortment of representative input patterns that are associated with their intended output response. Training uses optimization methods to iteratively determine the weights for intermediate and final feature neurons. In terms of a computational model, in some embodiments, each neuron calculates the dot product of inputs and weights, adds a bias, and applies a non-linear trigger function (for example, using a sigmoid response function).

Deep learning is a set of artificial intelligence algorithms that use a series of multiple layers of non-linear processing units. Each layer accepts input from the previous layer and provides outputs to the next layer. Deep learning neural networks can either be supervised or unsupervised depending on need, and may run on a CPU, GPU, ASIC, FPGA, or another microprocessor type. Neural networks can be implemented as one or more of a software application or software architecture that implements a desired data processing method or algorithm, a hardware implementation of devices that perform digital logic and data processing, or as a cloud based application where one or more software applications are executed on a remote platform composed of multiple servers. Deep neural networks (DNN) have shown significant improvements in several application domains, including computer vision and speech recognition. In computer vision, a particular type of DNN, known as a Convolutional Neural Network (CNN), has demonstrated state-of-the-art results in object recognition and detection.

FIG. 1 is a diagram illustrating a neural network comprised of a set of "neuron" layers that are used to implement an image processing function. As suggested by the illustration, each section of an image is processed by a sequence of layers of artificial neurons that perform functions or operations such as convolution, sub-sampling, activation, pooling, or generating a decision regarding classification, and thereby produce an output. Note that as part of a feedback control loop, after the input is processed by the network, the produced output may be compared with the known result by use of a "loss function". A typical loss function may have the form of one of the following: least square(s) or maximum likelihood, cross entropy, exponential cost function, etc. Note further that many standard loss functions are convex.

Figure 2:
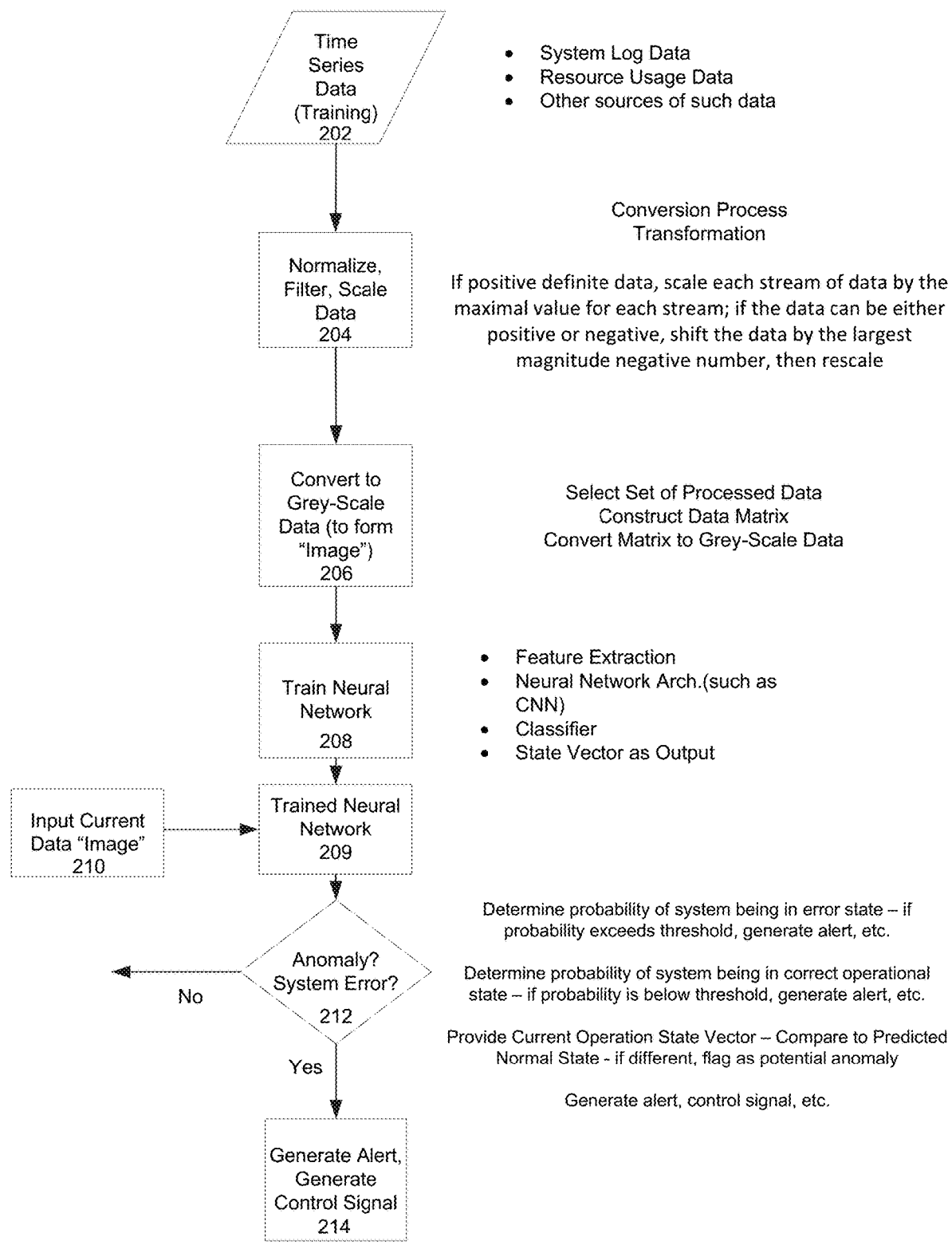
FIG. 2 is a flowchart or flow diagram illustrating a process, method, function, or operation for detecting anomalous behavior in a network or system, in accordance with one or more embodiments of the system and methods described herein.

FIG. 2 is a flowchart or flow diagram illustrating a process, method, function, or operation for detecting anomalous behavior in a network or system 200, in accordance with one or more embodiments of the system and methods described herein. In some embodiments, a set of time-series data (as suggested or illustrated by stage or step 202) is obtained or generated. This data may be from any source, but typically will take the form of data generated or being monitored by a network, such as system log data or resource usage data. The data is typically in the form of a value for the absolute or relative usage of a resource (such as a CPU, data bus, data storage capacity, etc.) at a point in time (or averaged over a time interval) at which the value is determined. A set or series of such measurements is obtained for multiple time intervals, thereby providing a time series of data.

Next, the time series data is converted, transformed or otherwise processed to make it suitable for use in the subsequent stages or steps of the innovative processes (as suggested by stage or step 204). This conversion, transformation or processing may include, but is not limited to (or required to include), normalization, filtering, rescaling, etc. A set of processed data is then selected for further analysis. This may be accomplished by selecting a set of time steps or time intervals for the data, and also (in some use cases) selecting a range of time in the future for which it is desired to "predict" the operation of the system or network. As will be described in additional detail, the choice of how far in the past to consider, and how far into the future to "predict" is typically determined by the user taking into account one or more of a variety of possible factors or considerations: system entropy, temporal correlation between events, etc.

The converted/processed time-series data and corresponding time steps are used to construct a matrix (which for purposes of an embodiment of the system and methods, represents an "image" of the network data). The matrix contains a data value for a specific resource or system/network characteristic at a specific time, or over a specific time interval. The matrix of values is then converted or transformed to greyscale data (as suggested by step or stage 206). For example, this conversion may be performed by Open Source software such as imsave from SciPy (www.scipy.org). Note that if the data is positive definite data, it is desirable to scale each stream of data by the maximal value for each stream; if the data can be either positive or negative, then it is desirable to shift the data by the largest magnitude negative number, then rescale as above.

The greyscale "image" data is then used as an input to train a convolutional neural network (CNN), such as ResNet, AlexNet, or GoogleNet, for example (as suggested by stage or step 208). Note that these examples are for illustrative purposes should not be taken to be a limitation or an exhaustive list of possible network architectures. These and similar neural networks have been used for image processing operations, such as object detection or image classification.

Note that embodiments of the system and methods disclosed herein enable the user to exploit the capabilities of deep convolutional neural networks (CNNs) to improve the accuracy of AI Models built to analyze collections of time-sequential data. In some embodiments, the time-series data is converted into a matrix and then into an image, which can exploit the ability of CNNs to classify images and therefore the time series data. In this regard, deep convolutional networks have recently achieved better than human performance on image classification tasks.

In contrast, current/conventional approaches to network anomaly detection use recurrent neural networks (RNNs), which can be problematic to implement as they are prone to the so-called vanishing/exploding gradient problem. As recognized by the inventors, modern deep CNNs do not suffer from this problem, and can require significantly less architectural effort and hyper-parameter tuning to achieve relatively high accuracies. Further, as will be understood by one of skill in the art, the neural network architecture determines what feature or characteristic the network will predict (i.e., a state vector, class probability, etc.) and what operations or mechanisms are used to predict it (e.g., by using convolution, LSTM, etc.).

As mentioned, the greyscale image (or images) data is used to "train" the CNN (as suggested by stage or step 208), resulting in a trained neural network, as suggested by stage or step 209. In this case, training refers to the ability of the CNN to "learn" certain characteristics of the "image" and in response, to set certain weights between the artificial neurons. Depending upon the purpose or use case of the CNN in the overall process (e.g., incident prediction, anomaly detection, etc.), the trained neural network (e.g., the CNN) may then be used to operate on other input data. In some embodiments, this input data may be a greyscale image produced from current time-series data after suitable normalization, filtering, scaling, conversion, etc. (as in steps 204 and 206), as suggested by stage or step 210.

The trained neural network operates on the input data 210 to identify or classify one or more of the following events, trends, etc. (as suggested by stage or step 212, where if a possible anomaly or system error is identified, then an alert or control signal may be generated, as suggested by stage or step 214):

Incident "prediction": calculating/determining the probability that an incident occurs in the system/network given the state history and/or status as described by the current greyscale "image", where such incidents may include:
Network incidents—intrusions, malicious activity or attempts at such, etc.;
Hardware failures;
Cardiac incidents (for EKG/EEG time-series data);
Automotive system failures or operational issues (based on data from automobile-based computing devices or controllers);
Manufacturing issues such as determine the quality of the output based on sensor data;
Part failures on aircrafts;
Financial market incidents for some financial instruments; or
Determining when a loan or an investment becomes "too risky".

Anomaly detection: if the current/actual state of a system/network and the predicted state differ by some predetermined amount (where the amount may be generated as a result of a machine learning algorithm applied to time-series data representing both normal and anomalous operating conditions), then generate a notification/alert that the system may be in an anomalous state. This may assist in:
Intrusion detection;
Identifying unauthorized resource usage;
Discovery of anomalies in scientific data;
Identifying process bottlenecks or unusual behavior in a process;
Fraud detection in financial data;
Diagnosis of a medical condition; or
Detection of changes in traffic patterns.
Generalization: in principle, the approach described herein may be generalized to the "prediction" of any time dependent state vector; for example, possible applications range throughout quantum and classical mechanics, from electronic structure to astrophysics;
Classical mechanics: predict classes of trajectories (lamellar, chaotic, etc.);
Astrophysics: given a time series of stellar evolution, predict class of supernova when it explodes; or
Quantum Mechanics: predict Evolution of qubit state in quantum computing.

For example, the CNN or other neural network architecture may be trained to "predict" one or more of the following:
State of system (vector) at some future time;
Probability that the system is operating in its nominal/correct state;
Probability that an incident occurs (i.e., that the system is in an error state); or
Generate an image describing the future state evolution of the system.

Note that in some use cases, time-series data representing the current state of a system or network may need to be generated or accessed in order to enable a comparison between what the neural network has learned is typical, non-anomalous behavior and the current state. For example, in order to compare a predicted state to known/current state vectors to determine if an incident has occurred or is likely to occur, wait until the predicted time, and compare the actual state to the predicted state, where a difference may indicate an anomaly.

In some embodiments, an implementation of the system and methods described herein may include the following stages, steps, functions, operations, etc.:
a. Acquire or generate time stamped log data that can be represented as integers or floating-point numbers;
b. Rescale each column of data by dividing by the maximum possible value for that data stream. The result will be a matrix of numbers between zero and one (0 and 1), inclusive;
As examples of possible data:
Timestamp, processor use (system), processor use (user), etc.;
00:31:38, 28.7, 13.4, . . . ;
Note that the approaches and methods described herein can utilize almost any time series of numerical vector data, including, but not limited to or requiring:
TCP/IP traffic
GPU utilization
HD read/write
Memory utilization For single data streams (e.g., sound, EKG, EEG, etc.) one can perform a Fourier Transform to obtain a spectrogram image.

c. Choose how much historical data to consider (i.e., the number of time steps) and how far in the future (the number of time steps) the system and methods are going to be used to "predict" the expected system or network state at a future time. The choice of how far into the future to predict is typically adjusted or "tuned" by the user, taking into account a variety of different considerations: system entropy, causal correlation between events, etc.

Take the matrix of numbers for this number of time steps (# of timesteps, # of data points) and convert it into a square greyscale image (for example, by using imsave from SciPy.org.);

note that when considering the amount of history to consider (the number of time steps worth of data to include), there are several factors to consider that may impact the decision:

did the root cause of the incident one wants to predict occur during the time window selected? If not, or if one doesn't know, it may be useful to consider a variety of time windows;

there are multiple ways to convert the time series to an image. In particular, one can construct the Gramian Summation Matrix, Gramian Difference Matrix, or Markov Transition Field associated with a given time series of data. One can then generate an RGB image from these three matrices (one for each channel). For multiple data inputs, one can generate these matrices for each data source, and construct an image from the sums, differences, or other combination that makes sense for the data;

when considering how far into the future to predict, look for time steps corresponding to a statistically significant auto-correlation lag;

d. Take the greyscale image(s) as an input to a convolutional neural network (CNN) or other form of neural network;

e. Train the neural network to predict (or generate) one of several states or events:

State of system (vector) at some future time;

Probability that the system is operating in a nominal state;

Probability that an incident occurs; or

An image describing the future state evolution of the system.

Note that, in general, training, implementation and output are the same for most use cases—the primary difference is in how the resulting model and its output are being used. The methodologies described herein generally apply to all time series problems where one has a system in state S at time t, and this state changes with time.

In some embodiments, a LogDataGenerator function may be used: this is a function that takes log data as an input, generates greyscale images, and associates the image with the value(s) to be predicted by the network, given the image. This function may be integrated with the capabilities of an AI platform to make the production of AI models based on log data easier to generate. Note that deep convolutional neural networks can be described as universal function approximators; i.e., with enough data, they can learn to predict almost anything that can be described by a function.

Another description of the general implementation of an embodiment of the system and methods described herein is the following set of stages, steps, operations, etc.:

a. Take a set of time series data (x,y,z, etc. vs t);

b. If negative values are allowed, additively shift the data so that the minimal value is identically zero;

c. Rescale each type of data (x,y,z, etc.) by the maximum possible value;

d. Choose some number of time steps (t) and construct a number of data streams by a number of time steps array/matrix;

e. Convert that array to a greyscale "image" and reshape/pad as necessary;

f. Associate that greyscale image with the quantity to be predicted—image/pred_data;

g. Use a supervised learning algorithm to train a deep CNN to predict pred_data from an "image".

Note that this process can be performed (in theory) for any set of time series data. In this regard, there is nothing tying the methods described herein to incident prediction/anomaly detection, which represent one possible application of the methods described herein. Note further, that conventionally, a user would take a single piece of time-sequenced data, and then generate a spectrogram (via Fourier analysis) and use that as input for a detection process. In contrast, in some of the embodiments described herein, the process aggregates several data streams and produces an image without doing Fourier decomposition. Further, while in theory one could create a spectrogram from each of multiple data streams, and then merge them into a single image, this introduces other issues that make it less desirable. Perhaps the biggest issue would be resources. Depending on the size of the dataset, the computational requirements can rapidly grow to an order of magnitude greater than simply calculating a greyscale image. For example, for an FFT, this could be $O(N \log N)$ per computation. By contrast, the Grayscale computation used in embodiments described herein would be $O(N)$ per data stream.

With respect to the neural network training process, the specifics may depend on what the user wants to predict (e.g., state, class probability, etc.). Typically, a CNN is trained using some form of stochastic gradient descent, although there are at least a half dozen different algorithms that improve on SGD (under varying conditions) and that could be used as well. CNNs are feature extractors; they extract (via an optimization process) the best features to perform the task. A user cannot, a priori, say what those features might be; however, a user can draw pictures of those features, a postori, and try to impose their idea about what those features are. The features that are extracted are largely irrelevant to whether or not they can accurately predict pred_data; that is, an end user only cares about the accuracy of the prediction, not what was used to make it.

Figure 3:
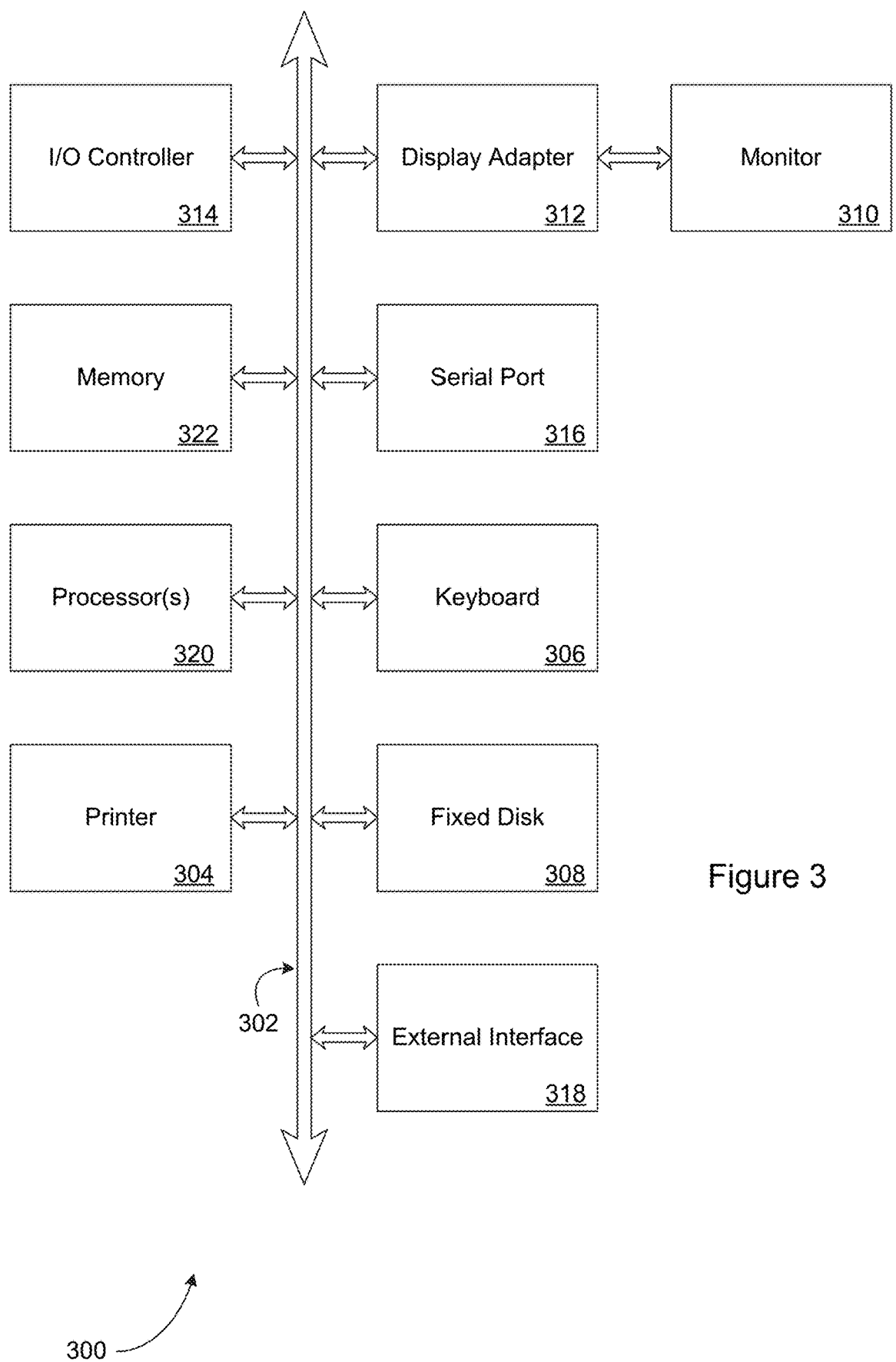
FIG. 3 is a diagram illustrating elements or components that may be present in a computer device or system configured to implement a method, process, function, or operation in accordance with an embodiment of the invention.

FIG. 3 is a diagram illustrating elements or components that may be present in a computer device or system configured to implement a method, process, function, or operation in accordance with an embodiment of the invention. As noted, in some embodiments, the inventive system and methods may be implemented in the form of an apparatus that includes a processing element and set of executable instructions. The executable instructions may be part of a software application and arranged into a software architecture. In general, an embodiment of the invention may be implemented using a set of software instructions that are designed to be executed by a suitably programmed processing element (such as a CPU, GPU (graphics processing unit), microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement or represent one or more aspects of the system and methods described herein, such as for:

- acquiring a set of time-series data generated by or characterizing the system;
- converting the set of time-series data into a set of grey-scale values;
- forming a plurality of matrices from the set of grey-scale values, wherein each matrix represents the grey-scale values at a specific time or during a specific time interval as an image; or
- training a neural network using the plurality of matrices.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. The computer-executable code or set of instructions may be stored in (or on) any suitable non-transitory computer-readable medium. In general, with regards to the embodiments described herein, a non-transitory computer-readable medium may include almost any structure, technology or method apart from a transitory waveform or similar medium.

As described, the system, apparatus, methods, processes, functions, and/or operations for implementing an embodiment of the invention may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 3 is a diagram illustrating elements or components that may be present in a computer device or system 300 configured to implement a method, process, function, or operation in accordance with an embodiment of the invention. The subsystems shown in FIG. 3 are interconnected via a system bus 302. Additional subsystems include a printer 304, a keyboard 306, a fixed disk 308, and a monitor 310, which is coupled to a display adapter 312. Peripherals and input/output (I/O) devices, which couple to an I/O controller 314, can be connected to the computer system by any number of means known in the art, such as a serial port 316. For example, the serial port 316 or an external interface 318 can be utilized to connect the computer device 300 to further devices and/or systems not shown in FIG. 3 including a wide area network such as the Internet, a mouse input device, and/or a document scanner. The interconnection via the system bus 302 allows one or more processors 320 to communicate with each subsystem and to control the execution of instructions that may be stored in a system memory 322 and/or the fixed disk 308, as well as the exchange of information between subsystems. The system memory 322 and/or the fixed disk 308 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands in (or on) a non-transitory computer readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus, and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions.

Note that in some embodiments, one or more of the blocks, or stages or steps may not necessarily need to be performed in the order presented, or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method for detecting anomalous behavior in a system, comprising:
    acquiring a set of time-series data generated by or characterizing past behavior of the system;
    converting the set of time-series data into a set of grey-scale values of the past behavior of the system;
    forming a plurality of matrices from the set of grey-scale values of the past behavior of the system, wherein each matrix represents the grey-scale values at a specific time or during a specific time interval as an image;
    training a neural network using the plurality of matrices of the past behavior of the system to determine a predicted state vector of the system at a future time, the future time determined by system entropy or causal correlation between events that occur in the system;
    acquiring time-series data representing a current operational state of the system;
    converting the set of time-series data representing the current operational state into grey-scale values of the current operational state;
    forming a matrix from the grey-scale values of the current operational state;
    inputting the formed matrix of the current operational state to the trained neural network, the neural network trained to:
        determine a predicted state vector of the system based on the formed matrix of the current operational state;
        compare the predicted state vector of the system at a predicted time to the actual state vector of the system at the predicted time;
        identify a difference between the predicted state vector and the actual state vector of the system at the predicted time;
        generate an output from the trained neural network that includes an indication that the predicted state vector and the actual state vector are different at the predicted time; and
    determining that the output indicates the presence of an anomaly in the system based on the indication that the predicted state vector and the actual state vector are different at the predicted time; and
    generating an alert in response to the indication of the presence of the anomaly.

2. The method of claim 1, wherein the time-series data of the past behavior of the system represents a value of a parameter or a characteristic of the system at a specific time or during a specific time interval in the past.

3. The method of claim 1, wherein the neural network is a convolutional neural network (CNN).

4. The method of claim 1, wherein the set of time-series data of the past behavior of the system is one of data representing TCP/IP traffic, GPU or CPU utilization, hard disk read/write actions, or memory utilization.

5. The method of claim 1, wherein the neural network is further trained to determine a probability that the system is operating in a normal state, a probability that a system anomaly has occurred, or an image describing a future state of the system.

6. The method of claim 5, wherein the output represents the probability that the system is operating in a normal state, and determining if the output indicates the presence of an anomaly further comprises determining if the probability is less than a threshold value.

7. The method of claim 1, wherein the system is a network of nodes with a connection between the nodes.

8. An apparatus for detecting anomalous behavior in a system, comprising:
- an electronic processor programmed with a set of executable instructions;
- an electronic data storage in which are stored the set of executable instructions, wherein the set of instructions includes instructions, which when executed, cause the apparatus to implement one or more processes to
- acquire a set of time-series data generated by or characterizing past behavior of the system;
- convert the set of time-series data into a set of grey-scale values of the past behavior of the system;
- form a plurality of matrices from the set of grey-scale values of the past behavior of the system, wherein each matrix represents the grey-scale values at a specific time or during a specific time interval as an image;
- train a neural network using the plurality of matrices of the past behavior of the system to determine a predicted state vector of the system at a future time, the future time determined by system entropy or causal correlation between events that occur in the system;
- acquire time-series data representing a current operational state of the system;
- convert the set of time-series data representing the current operational state into grey-scale values of the current operational state;
- form a matrix from the grey-scale values of the current operational state;
- input the formed matrix of the current operational state to the trained neural network, the neural network trained to:
  - determine a predicted state vector of the system based on the formed matrix of the current operational state;
  - compare the predicted state vector of the system at a predicted time to the actual state vector of the system at the predicted time;
  - identify a difference between the predicted state vector and the actual state vector of the system at the predicted time;
- generate an output from the trained neural network that includes an indication that the predicted state vector and the actual state vector are different at the predicted time;
- determine that the output indicates the presence of an anomaly in the system based on the indication that the predicted state vector and the actual state vector are different at the predicted time; and
- generate an alert in response to the indication of the presence of the anomaly.

9. The apparatus of claim 8, wherein the time series data of the past behavior of the system represents a value of a parameter or a characteristic of the system at a specific time or during a specific time interval in the past.

10. The apparatus of claim 8, wherein the neural network is a convolutional neural network (CNN).

11. The apparatus of claim 8, wherein the set of time-series data of the past behavior of the system is one of data representing TCP/IP traffic, GPU or CPU utilization, hard disk read/write actions, or memory utilization.

12. The apparatus of claim 8, wherein the neural network is further trained to determine a probability that the system is operating in a normal state, a probability that a system anomaly has occurred, or an image describing a future state of the system.

13. The apparatus of claim 12, wherein the output represents the probability that the system is operating in a normal state, and determining if the output indicates the presence of an anomaly further comprises determining if the probability is less than a threshold value.

14. The apparatus of claim 8, wherein the system is a network of nodes with a connection between the nodes.

* * * * *